(12) United States Patent
De Bono

(10) Patent No.: US 7,347,483 B2
(45) Date of Patent: *Mar. 25, 2008

(54) DOOR LIFT CONVERSION KIT FOR EXISTING VEHICLES

(76) Inventor: Joseph M. De Bono, 42 Russell Hill Drive, Barrie, Ontario (CA) L4N 0C2

( * ) Notice: Subject to any disclaimer, the term of this patent is extended or adjusted under 35 U.S.C. 154(b) by 0 days.

This patent is subject to a terminal disclaimer.

(21) Appl. No.: 11/439,243

(22) Filed: May 24, 2006

(65) Prior Publication Data

US 2006/0208529 A1    Sep. 21, 2006

Related U.S. Application Data

(63) Continuation of application No. PCT/CA2004/002038, filed on Nov. 26, 2004, which is a continuation of application No. 10/724,455, filed on Nov. 28, 2003, now Pat. No. 6,820,918.

(51) Int. Cl.
*B60J 5/00* (2006.01)
(52) U.S. Cl. .................... 296/146.12; 49/502
(58) Field of Classification Search ............ 296/146.4, 296/146.12, 202; 49/226, 232, 502; 16/289, 16/297, 286, 287, 374, 375
See application file for complete search history.

(56) References Cited

U.S. PATENT DOCUMENTS 2,947,567 A    8/1960    Barenyl
3,589,069 A    6/1971    Lecomte
3,693,997 A    9/1972    Dreyer
5,575,037 A    11/1996   Tolle et al.
6,030,025 A    2/2000    Kanerva (Continued)

FOREIGN PATENT DOCUMENTS

DE    8520432    9/1986

(Continued)

OTHER PUBLICATIONS

U.S. Appl. No. 10/159,943, filed Jun. 19, 2003, Audisio.

(Continued)

*Primary Examiner*—Jason S Morrow
(74) *Attorney, Agent, or Firm*—Santosh K. Chari; Brett J. Slaney; Blake, Cassels & Graydon LLP

(57) ABSTRACT

A retrofit vehicle door lift conversion kit adapted for lifting a vehicle door vertically that fits as a conversion kit replacing factory door hinges on a variety of different types of existing vehicles. A door attaching arm is mounted to a fixed chassis plate by a double axis connector for horizontal and vertical motion. A lift assisting actuator, which may be a vehicle specific pressure adjustable gas pressure spring, pivotally mounted between the plate and the arm, assists in lifting the door vertically. Replaceable vehicle specific plates mount to the fixed chassis plate. A replaceable vehicle specific arm and door attaching brackets mount to the door attaching arm. A horizontal limiter, a mechanical vertical height limit adjustment device, a vertical lift adjustment, and a safety lock for maintaining the door in the up position are adjustable for specific vehicles.

25 Claims, 3 Drawing Sheets

U.S. PATENT DOCUMENTS

| | | | |
|---|---|---|---|
| 6,086,137 | A | 7/2000 | Leschke et al. |
| 6,386,613 | B1 | 5/2002 | Vader |
| 6,591,452 | B2 | 7/2003 | Jacquin |
| 6,606,763 | B1 | 8/2003 | Brückner |
| 6,676,193 | B1 | 1/2004 | Hanagan |
| 6,808,223 | B1 | 10/2004 | Baum et al. |
| 6,820,918 | B1 | 11/2004 | De Bono |
| 6,845,547 | B2 | 1/2005 | Ham |
| 7,007,346 | B2 | 3/2006 | Hoffman |
| 7,048,322 | B2 * | 5/2006 | DeBono ................ 296/146.11 |
| 7,059,655 | B2 * | 6/2006 | Ham .................... 296/146.12 |
| 2003/0213102 | A1 | 11/2003 | Ham |
| 2003/0217436 | A1 | 11/2003 | Hashim et al. |
| 2005/0166363 | A1 | 8/2005 | Hoffman |

FOREIGN PATENT DOCUMENTS

| | | |
|---|---|---|
| DE | 9305933 | 8/1994 |
| DE | 4432022 | 3/1996 |
| DE | 29506597 | 8/1996 |

OTHER PUBLICATIONS

"*Decah VDC Installation Instructions for the 2000-2002 Toyota Celica Lambo Door Conversion Kit*", http://web.archive.org.wab/20030905164822/www.carexcess.com/PDF/celica_Installation.pdf, Oct. 10, 2003.

* cited by examiner

DOOR LIFT CONVERSION KIT FOR EXISTING VEHICLES

This application is a Continuation of PCT patent application number CA2004/002038 designating the United States, filed Nov. 26, 2004, which is a continuation of U.S. patent application Ser. No. 10/724,455, filed Nov. 28, 2003 now U.S. Pat. No. 6,820,918.

BACKGROUND OF THE INVENTION

1. Field of the Invention

The present invention relates to vehicle door actuators and in particular to a vehicle door lift conversion kit adapted for lifting a vehicle door vertically which fits on a variety of different types of existing vehicles as a conversion kit using a lift assist actuator to operate the door vertically.

2. Description of the Prior Art

It is desirable to have a vehicle door which opens vertically particularly when parking in tight spaces for easy access and egress and when loading or unloading long items which would not fit past a door that pivots open horizontally.

There is also a value associated with vehicle doors opening vertically because they are only a very few exclusive and expensive vehicles manufactured with doors that open vertically.

Prior art retrofit vehicle vertical door lift conversion kits are usually custom fit into a vehicle requiring extensive labor and custom-made parts to make the devices fit particular types of vehicles.

Prior art devices with no limiter on gas cylinders very quickly result in the lubricant leaking out, breaking the seal so the gas leaks out and the spring wears out.

Prior art devices are often fabricated of parts welded together so that the parts are not readily replaceable.

Prior art devices employ cheap gas chamber cylinders with short strokes to assist in lifting the door and they do not allow the door to open all the way up or give the user an adjustable range of motion.

Prior art devices fail to provide a safety lock for mechanically holding the door up in case of failure of the cylinder or actuator holding the door up.

What is needed is a retrofit vehicle vertical door lift conversion kit which is easily adaptable to fit most makes and models of vehicles and is easy to install and operate.

SUMMARY OF THE INVENTION

A primary object of the present invention is to provide a stationary fixed chassis plate with a movable door attaching arm attached to the fixed chassis plate by a double axis connector enabling horizontal and vertical pivoting between the arm and the plate and a lift assisting actuator pivotally connected between the arm and the plate as a universal door opening and lift assisting component of the door lift conversion kit with changeable adapter plates, removably mountable on the fixed chassis plate to fit any of a variety of vehicle types for attaching the door lift conversion kit to the vehicle body and a changeable extension arm and door mounting brackets, removably mountable on the door attaching arm to mount the door of any of a variety of vehicle types on the arm, thereby creating a universally adaptable door lift conversion kit for any of a variety of vehicle makes and types.

An object of the present invention is to provide a retrofit vehicle vertical door lift conversion kit using changeable adapter plates to fit various types of vehicles, and an adjustable actuator to assist in lifting vehicle doors which is easily adaptable to fit most makes and models of vehicles and is easy to install and operate.

Another object is to adjust the amount of gas in the gas charged lift assisting actuator for each vehicle make and model.

Another object of the present invention is to provide a retrofit vehicle vertical door lift conversion kit with easily replaceable parts that are not welded in place, which are bolted to ether allowing an individual part to be replaced and reducing replacement cost.

One more object of the present invention is to provide a retrofit vehicle vertical door lift conversion kit with a sealed linear bearing cam to provide smooth easy action in opening and closing the door vertically.

An additional object of the present invention is to provide a retrofit vehicle vertical door lift conversion kit with a variety of lift assisting actuators including, but not limited to, a gas charged spring, a lift spring or apparatus of any means, an electric linear actuator with a screw gear inside a chamber, which may be activated by a remote door opening control which trips a switch to activate the electric motor when the door is open past the roof line, and including a mechanical limiter for adjusting the amount of lift of the door to any desired height within its range.

A further object of the present invention is to provide a retrofit vehicle vertical door lift conversion kit with a safety lock in the form of a key or pin to be inserted to maintain the door in the tip position in case the lifting assist means should fail, which is very useful in situations where the door is to be held open for long periods of time, such as in a showroom or in working on a vehicle interior.

A further object of the present invention is to provide a retrofit vehicle vertical door lift conversion kit with a horizontal limiter so the device is adapted to limit the door to open normally only a sufficient horizontal distance so that the door is positioned outside of an edge of a roofline of a vehicle above a door opening served by the device.

One more object of the present invention is that it provides a limiter adjuster, which may be a safety screw, to adjust the door to a desired position, to lock the limiter in so the door doesn't hit any parts of the vehicle, such as a fender.

Yet another object of the present invention is a mechanical limiter of the gas charged spring of the lift assisting actuator, preventing the gas spring from running out to the full limit so it does not allow the piston to open to the full extent for longer life and greater reliability with no leakage and resultant wearing of the spring which occurs without the mechanical limiter.

In brief, a retrofit vehicle vertical door lift conversion kit, with changeable adapter plates to fit various vehicles, and an adjustable door lifting assist means, is easily adaptable to fit most makes and models of vehicles and is easy to install and operate. The device has easily replaceable parts, which are preferably bolted together, thereby allowing an individual part to be replaced and reducing replacement cost, although they may be welded together. The retrofit vehicle vertical door lift conversion kit has an actuator, which assists in lifting the door for smooth easy action when opening and closing the door vertically. The device provides a mechanical limiter for adjusting the amount of lift of the door to any desired vertical height within its range. A horizontal limiter is also provided, which limits the door to open normally only a sufficient horizontal distance so that the door is positioned outside of an edge of a roofline of a vehicle above a door opening served by the device. The retrofit vertical door lift conversion kit further comprises a safety lock in the form of a key or pin to be inserted to maintain the door in the up position in case the lifting assist means should fail, which very useful in situations where the door is to be held open for long periods of time.

An advantage of the present invention is that it may be adapted to fit different vehicles easily.

Another advantage of the present invention is that is easy and inexpensive to install.

An additional advantage of the present invention is that it limits the horizontal movement of the door.

One more advantage of the present invention is that it is easy to operate.

Yet another advantage of the present invention is that it is easy and inexpensive to replace.

Still another advantage of the present invention is that the individual components are replaceable.

An associated advantage of the present invention is that it may be locked in any of a number of predetermined upright positions (preferably the stroke on the gas spring reaches 65 mm and 95 mm when set at two preset holes).

A subsequent advantage of the present invention is that it allows the door to be opened to any desired adjustable vertical height.

One more advantage of the present invention is that the lift assisting actuator, the linear bearing, and the whole configuration stays loose and lubricated on moving parts and tight on control parts.

Yet one more advantage of the present invention is that it limits the gas charged spring of the lift assisting actuator, providing longer life and greater reliability with no leakage and resultant wearing of the spring.

A further advantage of the present invention is that when the door comes down, the present invention limits the door from sagging below a desired height.

Another advantage of the present invention is that it limits the raising action of the door to any of a variety of selected heights.

Yet another advantage of the present invention is that it limits the horizontal opening action of the door to a point just past the roof line to allow the door to lift outside the roof line.

One more advantage of the present invention is that the door lift height may be adjusted.

A further advantage of the present invention is that door opens and closes smoothly.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
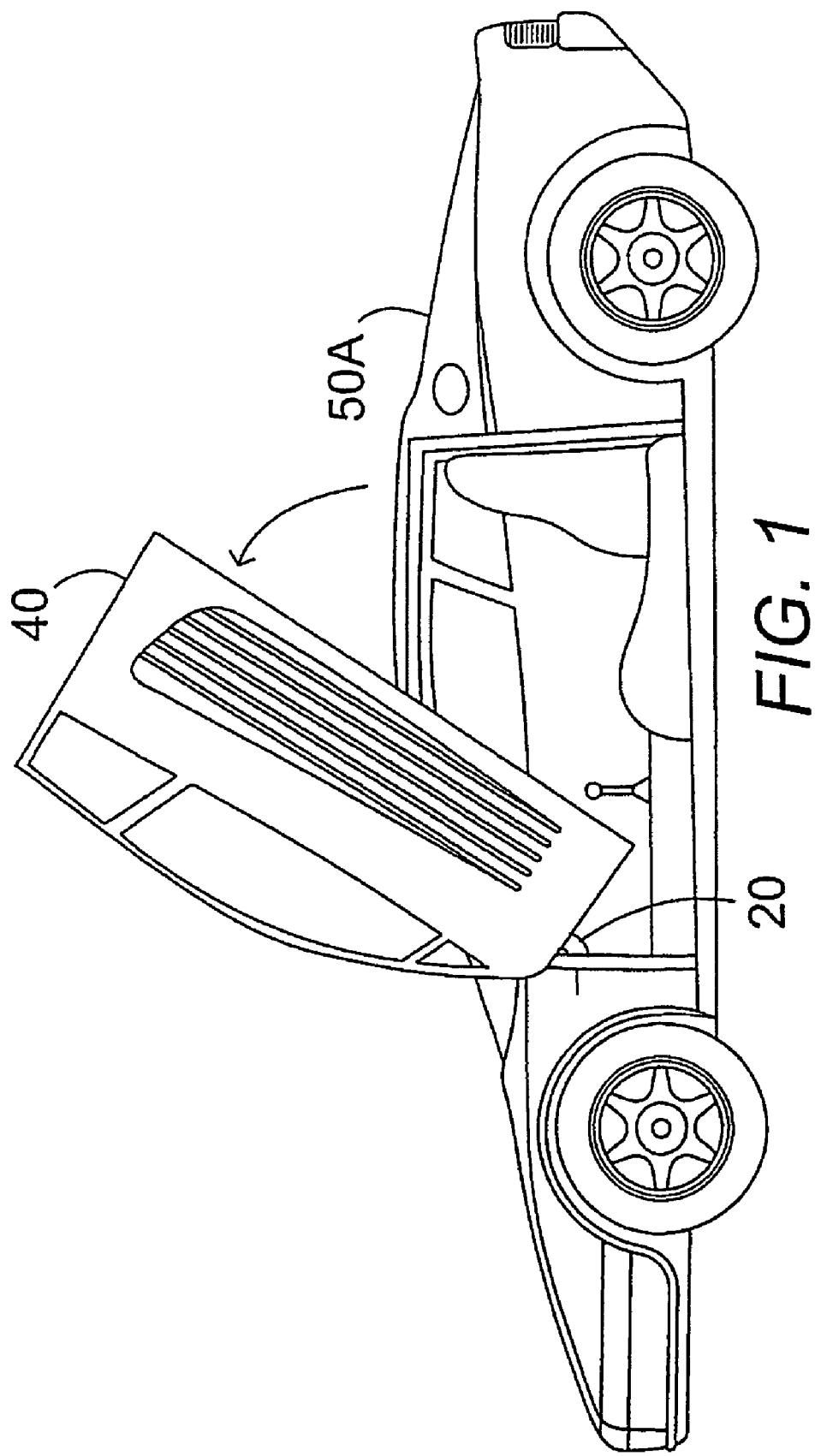
FIG. 1 is a side elevational view of a vehicle with the retrofit vehicle vertical door lift conversion kit of the present invention showing the door opened vertically.
Figure 1A:
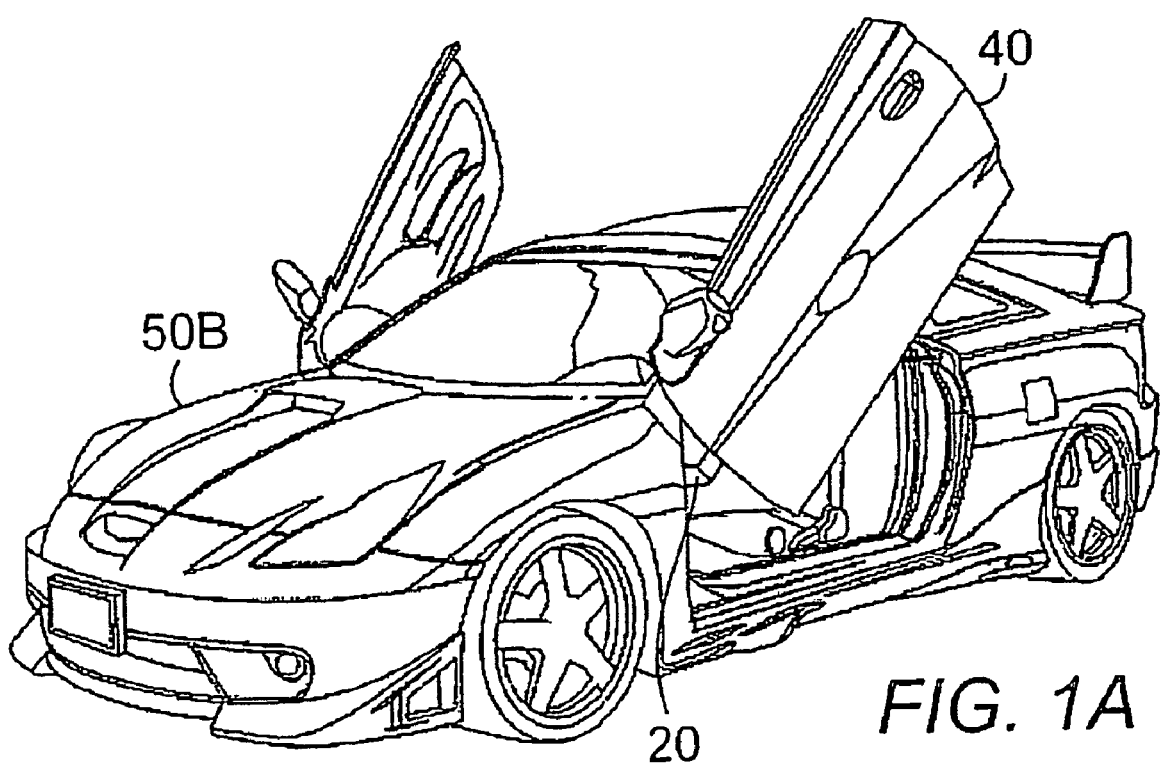
FIG. 1A is a perspective view of a vehicle with the retrofit vehicle vertical door lift conversion kit of the present invention showing both doors opened vertically.
Figure 2:
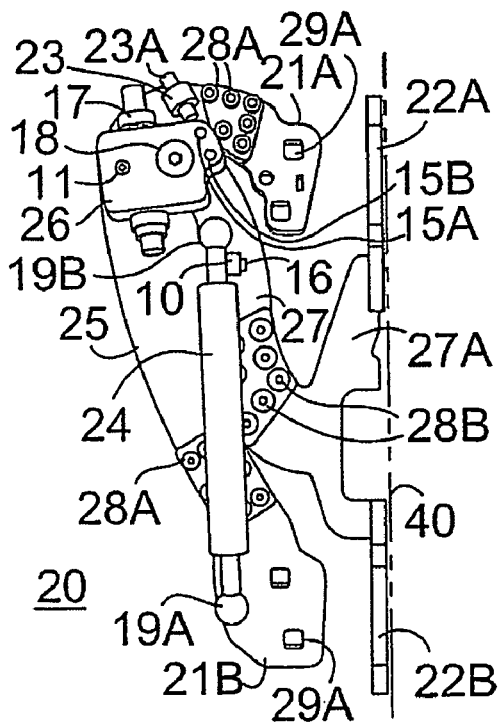
FIG. 2 is an elevational view of the present invention of FIG. 1 showing the orientation of the flanges attachable to a vehicle door in a door closed position.

In FIGS. 1-4, a vehicle door lift conversion kit device 20 for vertically opening a vehicle door 40 adaptable to fit a multiplicity of different vehicles 50, comprises a fixed chassis plate 25 having a pair of adapter plates 21A and 21B removably secured thereto by a series of bolts 28A. The parts may be welded if desired. The fixed chassis plate 25 is adapted to be installed on a multiplicity of different vehicle 50A and 50B types as a replacement door lift conversion kit 20 on a vehicle body 50 by attaching to the fixed chassis plate 25 any of a variety of different pairs of adapter plates 21A and 21B, that are vehicle specific, configured with mating bolt openings 29A to match vehicle specific bolt openings on a vehicle body 50 to secure to a door hinge receiving portion with mating bolt openings (not shown) on any of a multiplicity of different vehicle 50 types.

Figure 3:
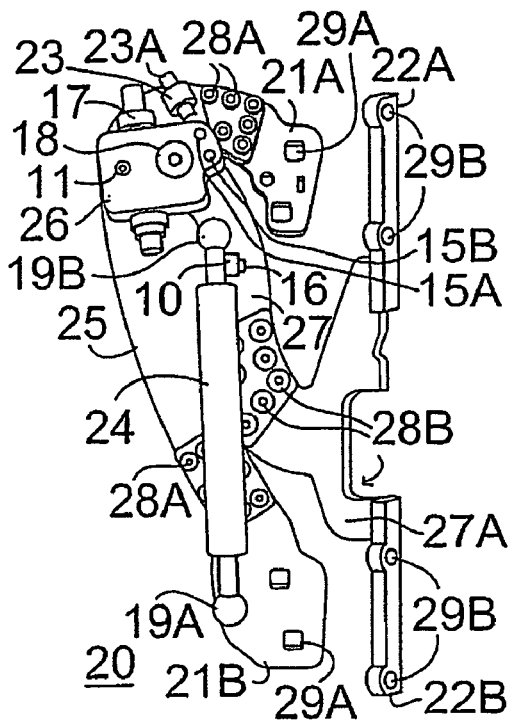
FIG. 3 is an elevational view of the present invention of FIG. 1 showing the orientation of the flanges attachable to a vehicle door in a door pivoted open in a normal horizontal position in which the vehicle door would be open just enough to clear the roof of the vehicle.

The device 20 also comprises a double axis connector 26 attached to the fixed chassis plate 25 by a horizontal pivoting means 17 adapted to allow a vehicle door 40 attached to the device 20 to pivot horizontally open and closed, as in FIG. 3 shown by the arrow with the door 40 opened to a predetermined horizontal limit based on the vehicle door clearing the roof line of the vehicle. The double axis connector 26 also comprises a vertical pivot linear bearing 18.

The device 20 further comprises a door attaching arm 27 pivotally attached to the double axis connector 26 by the vertical pivot linear bearing 18. The door attaching arm 27 has a preformed vehicle specific adapter arm 27A with two elongated vehicle specific door brackets 22A and 22B adapted with mating vehicle specific bolt openings 29B, as seen in FIG. 3, to attach to a vehicle door 40 with mating bolt openings (not shown). The universal door attaching arm 27 is adapted to fit any of a multiplicity of different vehicle doors 40 on different vehicle types. The two elongated door brackets 22A and 22B are removably secured to the door attaching arm 27 by a series of bolts 28B or welding.

The device 20 further comprises a limit means for limiting a horizontal distance that the door 40 may open so that the device 20 is adapted to limit the door 40 to open only a sufficient horizontal distance so that the door 40 is positioned outside of an edge of a roofline of a vehicle 50 above a door opening served by the device 20. The limit means for limiting a horizontal distance that a vehicle door 40 may open comprises a stop element, such as an adjustable pin or set screw 11, to stop the horizontal opening of the door 40 around the horizontal pivoting means 17 at a desired angle sufficient to position the door 40 outside of an edge of a roofline of a vehicle 50 above a door opening served by the device 20. The setscrew 11 is screwed into the double axis connector block 26 at an angle to the double axis connector block with the end of the setscrew 11 protruding between the block and the fixed chassis plate so that the setscrew 11 stops horizontal pivoting of the block 26 by contact of the setscrew with the fixed chassis plate.

The device 20 further comprises a lift assisting actuator 24 can be any of a variety of lift assisting means, including, but not limited to, a gas charged spring, a lift spring or apparatus of any means, an electric linear actuator with a screw gear inside a chamber, which may be activated by a remote door opening control which trips a switch to activate the electric motor when the door is open past the roof line, and including a mechanical limiter for adjusting the amount of lift of the door to any desired height within its range.

Figure 4:
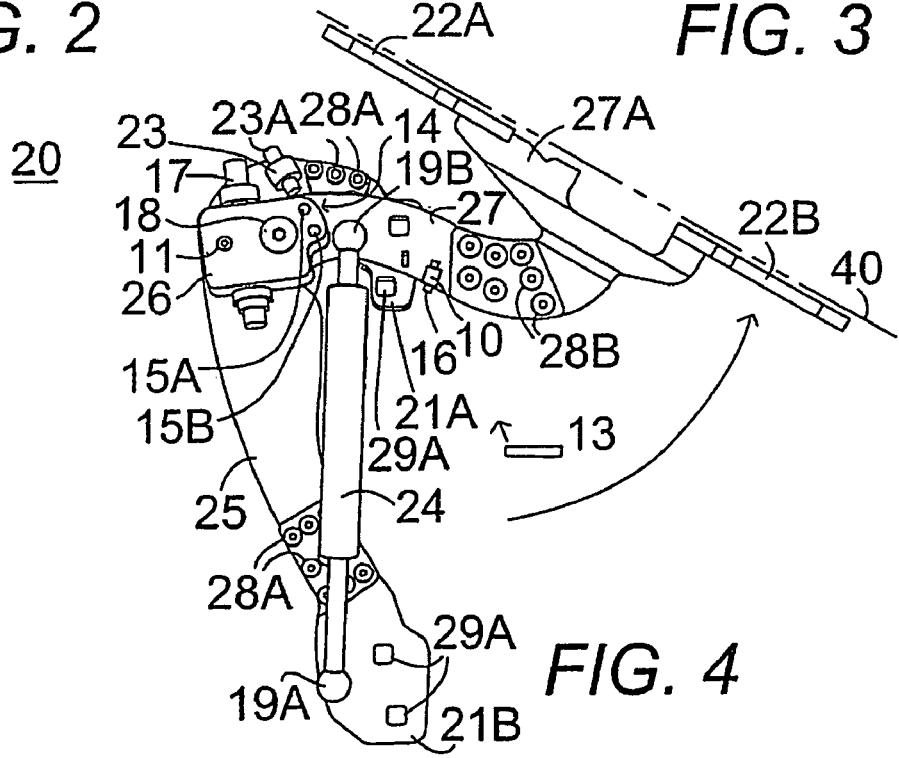
FIG. 4 is an elevational view of the present invention of FIG. 1 showing the orientation of the flanges attachable to a vehicle door in a door pivoted up position.

The device 20 also includes a safety lock means comprising a rigid pin bolt or key 13, seen in FIG. 4, securable between a fixed chassis plate opening 15 and a door attaching arm opening 14 for maintaining the door 40 in an up position. The safety lock means 13 is removably securable between the fixed chassis plate 25 and the door attaching arm 27 to maintain the door 40 in the up position in case the lift assisting actuator 24 should fail.

When the door lift assisting actuator 24 comprises a gas charged spring, the device 20 includes a means to adjust the amount of lift of the door, which comprises a means to regulate the amount of pressure in the gas charged spring to adapt the device to a particular vehicle.

The device 20 farther comprises an adjustable low limit means to limit downward movement of a vehicle door 40, the low limit means adapted to act between the door attaching arm 27 and the fixed chassis plate 25 to stop the movement therebetween. Preferably, the low limit means comprises a block 10 mounted on the door attaching arm 27 and a setscrew 16 protruding from the block an adjustable length between the block and the fixed chassis plate 25.

The device 20 comprises a mechanical limit means to limit the height of lift, which is preferably an adjustable screw and block means to act between the fixed chassis plate 25 and the door attaching arm 27 with the block means 23 mounted on the fixed chassis plate and the adjustable screw means comprising a setscrew 23A protruding from the block means an adjustable distance between the block means and the door attaching arm 27.

In practice, the existing hinges would be replaced by first removing the fender of the vehicle to gain access to the hinges on the vehicle, then removing the existing hinge from the vehicle and from the door 40. The vehicle specific adapter plates 21A and 21B are attached to the fixed chassis plate 25 and to the vehicle body. The two elongated vehicle specific door brackets 22A and 22B are attached to the door attaching arm 27 and then bolted to the door 40 through the bolt openings 29B and the mating bolt openings of the door 40. The fender of the vehicle 50 is then replaced. The setscrew 11 for limiting a horizontal distance that the door 40 may open is adjusted so that the device 20 is adapted to limit the door 40 to open only a sufficient horizontal distance so that the door 40 is positioned outside of an edge of a roofline of the vehicle 50 above the door opening. If a gas spring is used, pressure is adjusted for the specific vehicle. A vertical limiter 23 is adjusted for the specific vehicle. The setscrew 11 is adjusted for the specific vehicle. A safety lock 13, shown in FIG. 4, in the form of a rigid pin or key may be inserted between a selected fixed chassis plate opening 15A and 15B and a door attaching arm opening 14 for maintaining the door 40 in an up position, which very useful in situations where the door is to be held open for long periods of time.

Once installed, the device is easy to operate by opening the door horizontally the limited distance to clear the roof of the vehicle and then lifting the door up with the assistance of the device.

It is understood that the preceding description is given merely by way of illustration and not in limitation of the invention and that various modifications may be made thereto without departing from the spirit of the invention as claimed.

What is claimed is:

1. A vehicle door hinge comprising:
   a chassis plate for securing the hinge to a vehicle chassis, the chassis plate having at least one chassis mounting portion adapted for attaching the chassis plate to the vehicle chassis;
   a door attaching arm for securing a vehicle door to the hinge, the door attaching arm having at least one door mounting portion to permit attachment of the vehicle door to the door attaching arm, one or more of the at least one door mounting portion being removably securable to the door attaching arm; and
   a multiple axis connector pivotally connecting the chassis plate to the door attaching arm and permitting rotation about two or more axes to allow the door attaching arm to pivot outwardly and upwardly with respect to the chassis plate, said rotation being sufficient to enable the hinge to open, raise and close the vehicle door;
   wherein the door attaching arm, multiple axis connector and chassis plate are removably securable to each other to facilitate assembly of the vehicle hinge for converting pre-existing vehicle doors.

2. A vehicle door hinge according to claim 1, further comprising a lift assist actuator connected between the chassis plate and the door attaching arm to assist movement of the door attaching arm with respect to the chassis plate when opening, raising and closing the vehicle door.

3. A vehicle door hinge according to claim 1, wherein one or more of the at least one chassis mounting portion is removably securable to the chassis plate.

4. A vehicle door hinge according to claim 1 further comprising a limiter for limiting a horizontal distance that the vehicle door may open such that the hinge limits the outward movement of the door attaching arm with respect to the chassis plate to position the door outside a door opening defined by a roofline and a fender line of the vehicle.

5. A vehicle door hinge according to claim 4 wherein the limiter comprises a stop element to inhibit rotation of the door beyond a selected distance sufficient to position the door outside the edge of the roofline and the fender line.

6. A vehicle door hinge according to claim 1 further comprising a removable safety lock for maintaining the door in an upward open position, the safety lock being removably securable between the chassis plate and the door attaching arm.

7. A vehicle door hinge according to claim 1 further comprising a downward limiter to limit downward movement of the vehicle door at a lower limit, the downward limiter being adapted to act between the chassis plate and the door attaching arm to limit movement therebetween.

8. A vehicle door hinge according to claim 1 comprising a door attaching arm assembly comprising the door attaching arm and the at least one door mounting portion.

9. A vehicle door hinge comprising:
   a chassis plate for securing the hinge to a vehicle chassis, the chassis plate having at least one chassis mounting portion adapted for attaching the chassis plate to the vehicle chassis, one or more of the at least one chassis mounting portion being removably securable to the chassis plate;
   a door attaching arm for securing a vehicle door to the hinge, the door attaching arm having at least one door mounting portion to permit attachment of the vehicle door to the door attaching arm; and
   a multiple axis connector pivotally connecting the chassis plate to the door attaching arm and permitting rotation about two or more axes to allow the door attaching arm to pivot outwardly and upwardly with respect to the chassis plate, said rotation being sufficient to enable the hinge to open, raise and close the vehicle door.

10. A vehicle door hinge according to claim 9, further comprising a lift assist actuator connected between the chassis plate and the door attaching arm to assist movement of the door attaching arm with respect to the chassis plate when opening, raising and closing the vehicle door.

11. A vehicle door hinge according to claim 9, wherein said chassis plate comprises first and second chassis mounting portions, at least one of the chassis mounting portions being removably securable to the chassis plate.

12. A vehicle door hinge according to claim 9 further comprising a limiter for limiting a horizontal distance that the vehicle door may open such that the hinge limits the outward movement of the door attaching arm with respect to the chassis plate to position the door outside a door opening defined by a roofline and a fender line of the vehicle.

13. A vehicle door hinge according to claim 12 wherein the limiter comprises a stop element to inhibit rotation of the door beyond a selected distance sufficient to position the door outside the edge of the roofline and the fender line.

14. A vehicle door hinge according to claim 9 further comprising a removable safety lock for maintaining the door in an upward open position, the safety lock being removably securable between the chassis plate and the door attaching arm.

15. A vehicle door hinge according to claim 9 further comprising a downward limiter to limit downward movement of the vehicle door at a lower limit, the downward limiter being adapted to act between the chassis plate and the door attaching arm to limit movement therebetween.

16. A vehicle door hinge according to claim 9 wherein the door attaching arm, multiple axis connector and chassis plate are removably securable to each other to facilitate assembly of the hinge for converting pre-existing vehicle doors.

17. A vehicle door hinge according to claim 9 comprising a chassis plate assembly comprising the chassis plate and the at least one chassis mounting portion.

18. A vehicle door hinge according to claim 9 further comprising a lift assist actuator connected to the door attaching arm at one end and attachable to the vehicle chassis at another end, the lift assist actuator for assisting movement of the door attaching arm with respect to the vehicle chassis when opening, raising and closing the vehicle door.

19. A vehicle door hinge according to claim 1 further comprising a lift assist actuator connected to the door attaching arm to assist movement of the door attaching arm with respect to the chassis plate when opening, raising and closing the vehicle door.

20. A vehicle door hinge according to claim 9 further comprising a lift assist actuator connected to the door attaching arm to assist movement of the door attaching arm with respect to the chassis plate when opening, raising and closing the vehicle door.

21. A vehicle door hinge comprising:
at least one chassis plate for securing the hinge to a vehicle chassis, the at least one chassis plate having at least one chassis mounting portion adapted for attaching the at least one chassis plate to the vehicle chassis;
at least one door attaching arm for securing a vehicle door to the hinge, the at least one door attaching arm having at least one door mounting portion to permit attachment of the vehicle door to the at least one door attaching arm; and
a multiple axis connector pivotally connecting one of the at least one chassis plate to one of the at least one door attaching arm and permitting rotation about two or more axes to allow the at least one door attaching arm to pivot outwardly and upwardly with respect to the at least one chassis plate, said rotation being sufficient to enable the hinge to open, raise and close the vehicle door
wherein the at least one door attaching arm, multiple axis connector and at least one chassis plate are removably securable to each other to facilitate assembly of the hinge for converting pre-existing vehicle doors.

22. A vehicle door hinge according to claim 21 further comprising a lift assist actuator connected to the door attaching arm to assist movement of the door attaching arm with respect to the chassis plate when opening, raising and closing the vehicle door.

23. A method for installing a door hinge kit for converting a pre-existing vehicle door, the method comprising:
obtaining the door hinge kit comprising: at least one chassis plate for securing the hinge to a vehicle chassis, the at least one chassis plate having at least one chassis mounting portion adapted for attaching the at least one chassis plate to the vehicle chassis; at least one door attaching arm for securing a vehicle door to the hinge, the at least one door attaching arm having at least one door mounting portion to permit attachment of the vehicle door to the at least one door attaching arm; and a multiple axis connector pivotally connecting one of the at least one chassis plate to one of the at least one door attaching arm and permitting rotation about two or more axes to allow the at least one door attaching arm to pivot outwardly and upwardly with respect to the at least one chassis plate, said rotation being sufficient to enable the hinge to open, raise and close the vehicle door; wherein the at least one door attaching arm, multiple axis connector and at least one chassis plate are removably securable to each other to facilitate assembly of the vehicle hinge for converting preexisting vehicle doors;
mounting the at least one chassis mounting portion to the vehicle chassis;
mounting the at least one door mounting portion to the vehicle door; and
connecting the multiple axis connector to one of the at least one chassis plate and to one of the at least one door attaching arm.

24. The method according to claim 23 comprising attaching the at least one chassis mounting portion to the at least one chassis plate and attaching the at least one door mounting portion to the at least one door attaching arm.

25. The method according to claim 24 comprising choosing the at least one chassis mounting portion and the at least one door mounting portion according to vehicle type; wherein the at least one chassis mounting portion and the at least one door mounting portion are removably securable to the at least one chassis plate and at least one door attaching arm respectively.

* * * * *